May 21, 1935.   M. W. McCONKEY   2,001,971
BRAKE
Filed April 27, 1932   2 Sheets-Sheet 1

INVENTOR.
MONTGOMERY W. McCONKEY
BY Jerome R. Cox
ATTORNEY

May 21, 1935.   M. W. McCONKEY   2,001,971
BRAKE
Filed April 27, 1932   2 Sheets-Sheet 2

INVENTOR.
MONTGOMERY W. McCONKEY
BY Jerome R. Cox
ATTORNEY

Patented May 21, 1935

2,001,971

UNITED STATES PATENT OFFICE 2,001,971

BRAKE

Montgomery W. McConkey, South Bend, Ind., assignor to Bendix Aviation Corporation, South Bend, Ind., a corporation of Delaware Application April 27, 1932, Serial No. 607,879

4 Claims. (Cl. 188—152)

This invention relates to braking systems and is illustrated as applied to a hydraulic braking system.

Devices have been proposed heretofore for use in combination with braking systems, for providing a relatively low mechanical advantage between the pedal and brakes during the initial braking stages and for providing a relatively high mechanical advantage during later braking stages. Usually these devices have been interposed in the connections between the pedal and the brakes and have been positioned adjacent to the pedal. Because of this construction, the high forces obtained must be transmitted through substantially the entire connecting mechanism with the consequent increased danger of breakage in the case of mechanical connections and of breakage and loss of fluid in the case of fluid systems.

One of the objects of this invention is to provide novel means for obtaining relatively great mechanical advantage ratios for the application of the brakes.

A further object of this invention is to provide a two phase brake force transmission system adapted to be positioned within the wheel to be braked so as to minimize the friction developed by the high pressures attained and to minimize the danger of breakage of parts of the connections by reason of the high pressures developed.

A feature of the invention is a novel two phase wheel cylinder.

Further objects and features of the invention will be apparent after a reading of the subjoined specification and claims and after a consideration of the attached drawings in which:

Figure 1:
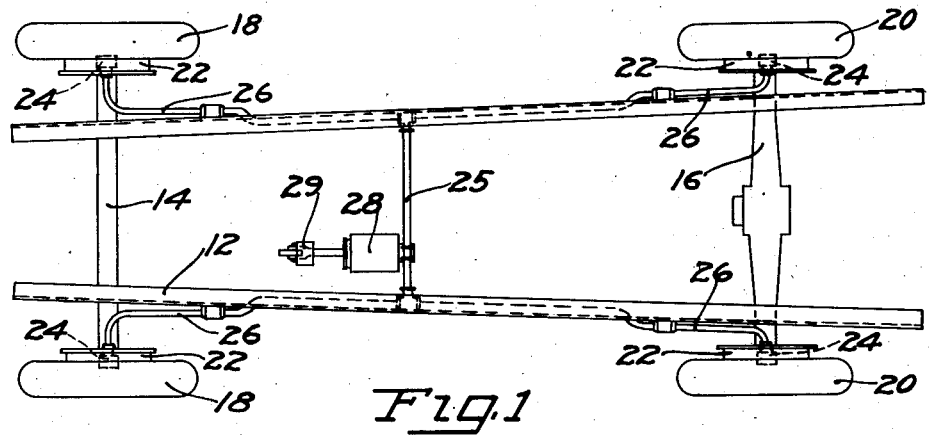
Figure 1 is a plan view of the chassis of an automobile equipped with a hydraulic braking system illustrating my invention.

Referring in detail to the drawings, there is shown in Fig. 1, an automobile having a chassis 12 supported by a forward axle 14 and a rearward axle 16, the axles being supported respectively on forward wheels 18, and rearward wheels 20.

The wheels 18 and 20 are provided with brake drums 22 and positioned in each of the brake drums are shoes adapted to be operated by wheel cylinders 24 to which liquid is supplied, through conduits 25 and 26 from a master cylinder 28, the latter being operated by a pedal 29.

Figure 2:
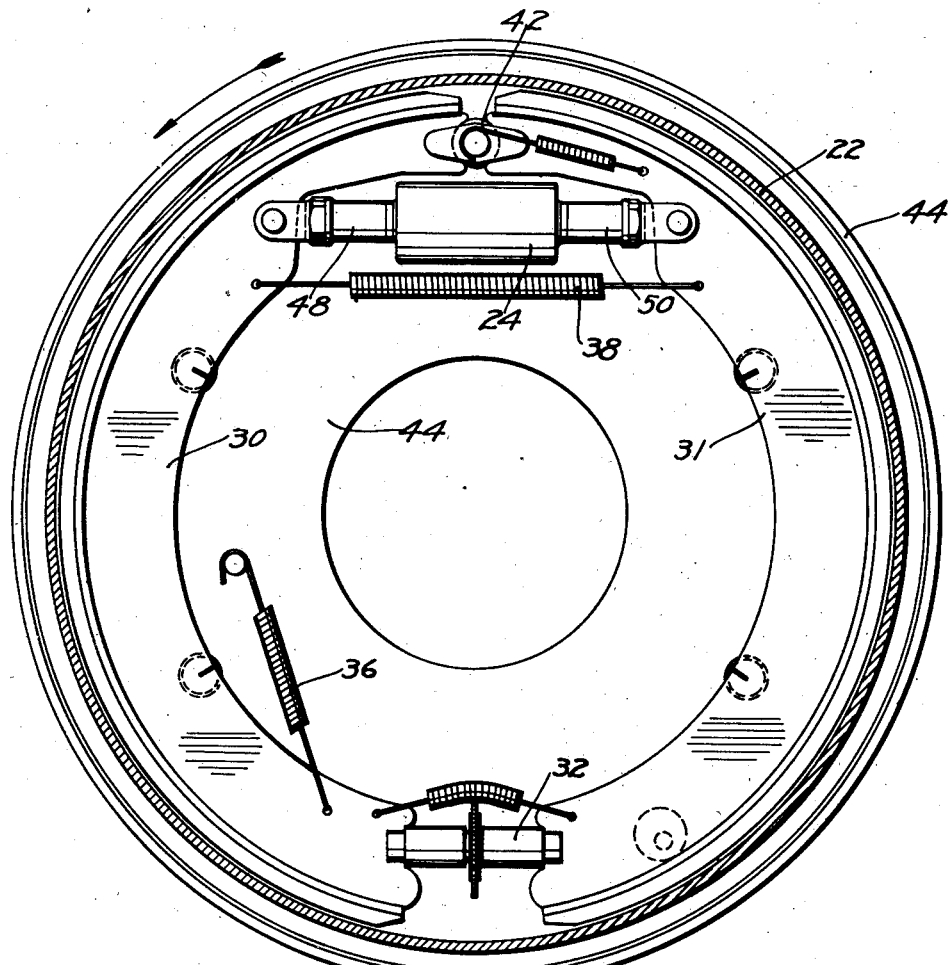
Figure 2 is a view in vertical section and on an enlarged scale showing one of the wheels of the automobile of Figure 1.

As is shown more clearly in Figure 2, each of the drums 22 is provided with a pair of braking shoes 30 and 31 secured to each other by an adjustable link 32 and normally held in the selected "brake-off" position by springs 36 and 38. The ends of the shoes 30 and 31 opposite to the adjustable connection 32 normally bear against an anchor pin 42, and one of said ends or the other (dependent upon the direction of rotation of the drum during the braking operation) anchors against said pin in braking. The drum is provided with a backing plate 44 to which is secured the wheel cylinder 24. The cylinder 24 is provided with a pair of pistons to which there are connected respectively the piston rods 48 and 50, the latter being secured to the shoes 30 and 31 respectively.

Figure 3:
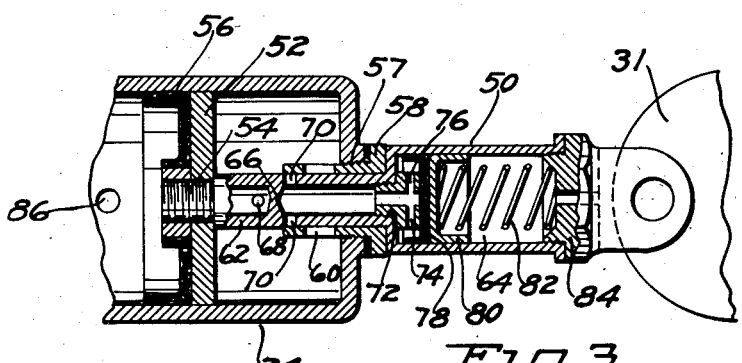
Figure 3 is a view in vertical section and on a still greater enlarged scale showing a fragment of the wheel cylinder of Figures 1 and 2.
Figure 5:
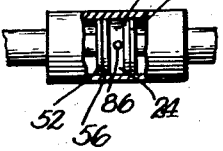
Figure 5 is a view of cylinder 24 with parts broken away and parts in section for showing the interior of the cylinder.

Each wheel cylinder 24 has at each end a piston such as the piston 52 (Fig. 3) which is formed with a central opening or passage 54 and which is provided with an annular packing cup 56. The ends of the cylinder 24 are formed with threaded openings such as 57 and into each of these openings there is threaded a sleeve 58 formed with ports 60. The piston rod 50 comprises a tube 62 having its inner end threaded into the opening 54 and having its outer end enlarged to form a pressure relief chamber or reservoir 64. The interior of the small portion of the tube 62 forms a passageway for fluid and this passageway is provided with a partition 66 and on opposite sides of the partition, the tube is formed with ports such as the ports 68 and the ports 70 respectively. At the point where the tube 62 merges into the chamber 64, a plug 72 is threaded into the tube 62 and normally resting upon this plug is a piston comprising a rubber cup 78 and a guide 80. This piston is normally held against the plug 72 by a spring 82 which bears at its opposite end against a vented fitting 84 screwed into the chamber 64 and having its opposite end secured to the shoe 31.

In the operation of a brake system constructed as described above, movement of the pedal 29 forces liquid from the master cylinder 28 through the conduits 25 and 26 to each of the cylinders 24 and the liquid entering the cylinder through ports 86 forces the pistons 52 outward. Liquid trapped in the compartment between the piston 52 and the outer end of the cylinder passes through the ports 68 into the tube 62 and thence to the compartment at the center of the cylinder. However, inasmuch as the annular area at the end of the cylinders is smaller than the cross sectional area at the center of the cylinder, the pressure of the liquid causes the piston 52 to move outward. The effective area of the piston on which the pressure is acting is therefore an area corresponding to the cross section of the tube 62. The movement of the piston 52 outward forces the shoes into contact with the drum.

At about the same time that the shoes contact with the drum, the tube 62 moves so that the ports 68 are covered by the sleeve 58 and so that the ports 70 register with the ports 60. Thereupon, further bypassing of liquid from the end of the cylinder to the center of the cylinder is prevented but the liquid which is trapped in the end of the cylinder is allowed to pass through the tube 62, and through the ports 74 and 76 into the pressure relief chamber 64. Thereafter, the liquid forced into the cylinder 24 acts effectively upon the whole surface of the piston 52, thereby moving the shoes at a slower rate but at increased pressure. Thereby the mechanical advantage through which the pedal acts upon the brakes is increased. The liquid forced into the relief chamber 64 forces the piston 78—80 outward, this movement being allowed by the compression of the spring 82 and by the escape of air through the vented plug 84.

Figure 4:
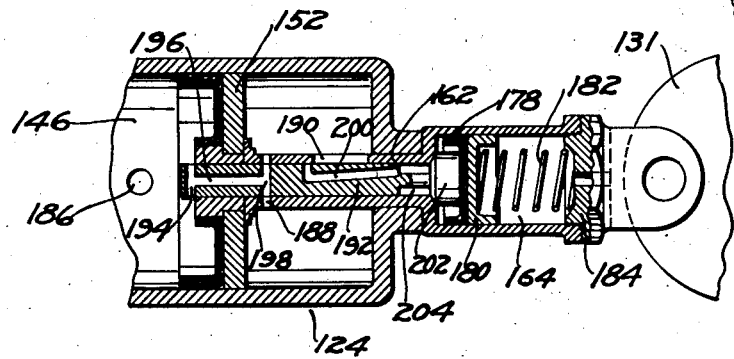
Figure 4 is a view similar to Figure 3 showing a modified form of wheel cylinder.

In Figure 4 a cylinder 124 is provided at each end with a piston 152 and a tube 162. The latter is formed with a pressure relief chamber 164 having its outer end closed by a vented fitting 184. The fitting 184 is attached to the shoe 131 and together with the chamber 164 and the tube 162 serves as a piston rod. The tube 162 is formed with slots 188 and 190 and carries a valve plug 192. The latter is formed with bores 194, 196, 198, and 200 and is provided at its outer end with a conical valve element 202 which normally contacts with a rubber cup 178 associated with a guide 180 acted upon by a spring 182. The spring 182 is of pre-determined strength so that the valve member 192 is moved only when the pressure in the cylinder 124 reaches a certain predetermined value.

The bore 194 normally communicates with the center of the cylinder 124 and is arranged to intersect the bore 196, the latter also intersecting the bore 198. The bore 198 normally registers with the slot 188 and thus normally liquid may pass from the center of the cylinder 146 to the end thereof. The bore 200 communicates with an annular space 204 formed adjacent the outer end of the valve member 192 but is normally cut off from communication with the cylinder 146. However, when the valve member 192 is moved outward by pressure, the bore 200 registers with the slot 190 so that liquid trapped in the end of the cylinder may escape through the slot 190, the bore 200, and the recess 204 and thus past the valve member 202 to the pressure relief chamber 164.

It is believed that the operation of this modified form of my invention will be apparent from the above description. Operation of a foot pedal similar to 29 causes a master cylinder such as 28 to force liquid into the cylinders 146 through the ports 186. The pressure of the fluid acting upon the pistons 152 moves each of the pistons inward and the associated tube 162, pressure relief chamber 164, fitting 184 and shoe 131 all move with the piston. As soon as sufficient resistance to movement of the shoes is encountered, the pressure of liquid in the system increases until it is sufficient to move each of the valve members 192 outward to close communication between the center of the cylinder 146 and the outer end thereof. Thereupon communication is established between the outer end of the cylinder and the pressure relief chamber 164. Thereafter, the liquid acts upon the pistons 152 to force the shoes into contact with the drums with a very greatly increased pressure.

It is to be understood that the above described embodiments of my invention are for the purpose of illustration only and various changes may be made therein without departing from the spirit and scope of the invention.

I claim:

1. In a fluid braking system a wheel cylinder, a pair of pistons positioned in said cylinder and dividing it into a central compartment and two end compartments, a tube secured to each of said pistons to extend through the associated end compartments and formed with passageways, a pressure relief chamber associated with the outer end of each said tube, a small piston in each said chamber, a spring acting on each said small piston and means dependent on the phase of brake application for controlling said passageways to connect said end compartments to said central compartment or to connect said end compartments to said pressure relief chambers.

2. In a fluid braking system; a cylinder; a piston in said cylinder, a tube secured to said piston and connected at times with the interior of said cylinder, a relief chamber associated with the outer end of said tube, and means for at times preventing passage of fluid from said cylinder through said tube into said relief chamber.

3. In a fluid braking system, a cylinder, a piston therein dividing said cylinder into two compartments, a tube associated with said piston, a pressure relief chamber associated with said tube, and a valve controlled by fluid pressure for connecting one of said compartments through said tube alternatively with the other compartment or with the pressure relief chamber.

4. In a fluid braking system, a friction braking element, a cylinder, a piston therein dividing said cylinder into two compartments and operatively connected to said braking element, a tube associated with said piston, a pressure relief chamber associated with said tube, and a valve for connecting one of said compartments through said tube alternatively with the other compartment or with the pressure relief chamber.

MONTGOMERY W. McCONKEY.